(12) United States Patent
Shaaban et al.

(10) Patent No.: US 7,318,845 B2
(45) Date of Patent: Jan. 15, 2008

(54) COMPACT DISTILLATES FUEL PROCESSOR WITH EFFECTIVE SULFUR REMOVAL PROCESS

(75) Inventors: Aly H. Shaaban, Lynn Haven, FL (US); Timothy J. Campbell, Parker, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 562 days.

(21) Appl. No.: 10/600,753

(22) Filed: Jun. 23, 2003

(65) Prior Publication Data

US 2004/0006914 A1    Jan. 15, 2004

Related U.S. Application Data

(60) Provisional application No. 60/394,661, filed on Jul. 10, 2002.

(51) Int. Cl.
  *B01J 7/00* (2006.01)
  *B01J 8/00* (2006.01)
  *C10G 45/00* (2006.01)

(52) U.S. Cl. .......... 48/61; 48/84; 48/211; 48/127.9; 48/128; 208/57; 208/46; 208/49; 208/51; 208/58; 208/78; 208/79; 208/80; 208/133; 208/67; 208/68; 208/69; 208/73; 208/83; 208/208 R; 208/213; 208/220; 208/308

(58) Field of Classification Search .......... 208/51, 208/57, 58, 220; 422/180
See application file for complete search history.

(56) References Cited

U.S. PATENT DOCUMENTS

| 3,558,473 A | 1/1971 | Csicsery et al. ............ 208/60 |
|---|---|---|
| 3,617,485 A | 11/1971 | Kittrell ..................... 208/59 |
| 3,655,448 A | 4/1972 | Setzer ........................ 429/20 |
| 3,671,419 A * | 6/1972 | Ireland et al. ............. 208/57 |
| 3,671,421 A * | 6/1972 | Peck et al. ................ 208/68 |
| 3,862,899 A * | 1/1975 | Murphy et al. ........... 208/93 |
| 3,948,754 A | 4/1976 | McCollum et al. ...... 208/391 |
| 4,183,805 A | 1/1980 | Antos ....................... 208/139 |
| 4,238,366 A | 12/1980 | Antos ....................... 502/230 |
| 4,325,811 A | 4/1982 | Sorrentino ............... 208/113 |
| 4,657,664 A | 4/1987 | Evans et al. ............. 208/211 |

(Continued)

OTHER PUBLICATIONS

OlsenOlsen, John C., "Unit Processes and Principles of Chemical Engineering", Jul. 5th 1932, D. Van Nostrand Company, Inc., Chapter I, pp. 1-3.*

*Primary Examiner*—Glenn A. Caldarola
*Assistant Examiner*—Kaity Handal
(74) *Attorney, Agent, or Firm*—Jacobson Holman PLLC (57) ABSTRACT

A distillate fuel steam reformer system in which a fuel feed stream is first separated into two process streams: an aliphatics-rich, sulfur-depleted gas stream, and an aromatics- and sulfur-rich liquid residue stream. The aliphatics-rich gas stream is desulfurized, mixed with steam, and converted in a reforming reactor to a hydrogen-rich product stream. The aromatics-rich residue stream is mixed with air and combusted to provide heat necessary for endothermic process operations. Reducing the amounts of sulfur and aromatic hydrocarbons directed to desulfurzation and reforming operations minimizes the size and weight of the overall apparatus. The process of the invention is well suited to the use of microchannel apparatuses for heat exchangers, reactors, and other system components, which may be assembled in slab configuration, further reducing system size and weight.

21 Claims, 10 Drawing Sheets

U.S. PATENT DOCUMENTS

| | | | |
|---|---|---|---|
| 4,976,747 A | 12/1990 | Szydlowski et al. | 48/127.9 |
| 5,124,140 A * | 6/1992 | Okada et al. | 423/650 |
| 5,213,912 A | 5/1993 | Kunz et al. | 429/34 |
| 5,308,456 A | 5/1994 | Kunz et al. | 429/16 |
| 5,573,866 A | 11/1996 | Van Dine et al. | 429/13 |
| 5,938,800 A | 8/1999 | Verrill et al. | 48/127.9 |
| 6,090,312 A | 7/2000 | Ziaka et al. | 252/373 |
| 6,120,923 A | 9/2000 | Van Dine et al. | 429/17 |
| 6,162,267 A | 12/2000 | Priegnitz et al. | 48/199 FM |
| 6,187,465 B1 | 2/2001 | Galloway | 429/17 |
| 6,210,821 B1 | 4/2001 | Lesieur et al. | 429/17 |
| 6,221,280 B1 | 4/2001 | Anumakonda et al. | 252/372 |
| 6,254,839 B1 | 7/2001 | Clawson et al. | 422/190 |
| 6,280,864 B1 | 8/2001 | Towler et al. | 429/17 |
| 6,299,994 B1 | 10/2001 | Towler et al. | 429/17 |
| 6,316,134 B1 | 11/2001 | Cownden et al. | 429/19 |
| 6,331,366 B1 | 12/2001 | Van Dine et al. | 429/17 |
| 6,464,857 B2 * | 10/2002 | Miller | 208/46 |
| 6,815,106 B1 * | 11/2004 | Salvador et al. | 429/22 |
| 2001/0004500 A1 | 6/2001 | Grasso et al. | 429/13 |
| 2001/0020596 A1 | 9/2001 | Jossens et al. | 208/212 |
| 2002/0031690 A1 | 3/2002 | Shimazu et al. | 429/19 |
| 2002/0041842 A1 | 4/2002 | Ruettinger et al. | 423/230 |
| 2002/0041986 A1 | 4/2002 | Wojtowicz et al. | 429/20 |
| 2002/0071976 A1 | 6/2002 | Edlund | 429/19 |
| 2002/0122965 A1 * | 9/2002 | Yu | 429/17 |

* cited by examiner

Gasoline Hydrocarbon and Organo-Sulfur Distributions
as determined by GC-PFPD

COMPACT DISTILLATES FUEL PROCESSOR WITH EFFECTIVE SULFUR REMOVAL PROCESS

This is a complete utility application entitled to the priority and claiming the benefit of U.S. provisional application Ser. No. 60/394,661 filed Jul. 10, 2002, which is hereby incorporated by reference in its entirety.

TECHNICAL FIELD OF THE INVENTION

The present invention relates to a reformer for reforming hydrocarbon distillate fuels such as gasoline, diesel fuel, jet fuels such as Jet A and JP-8, kerosene, and the like, to produce hydrogen as a, fuel for use in fuel cells. More particularly, the present invention relates to an improvement in a steam reformer for integration of fuel feedstock pretreatment operations and reformer system thermal management.

BACKGROUND OF THE INVENTION

Fuel cells are able to convert hydrogen fuel to electric power in a simple, efficient process with low pollutant emissions, and are therefore of considerable commercial interest. A number of fuel cell designs have been introduced, using various operating temperatures. Both low temperature fuel cells, such as proton exchange membrane fuel cells, and high temperature fuel cells, such as solid oxide fuel cells, require fuel feeds containing low concentrations of sulfur.

To be practical for most commercial applications, fuel cell systems must be compact, efficient, and able to use widely available fuels. Hydrogen gas is not a widely distributed fuel, and is difficult to store and transport. Alcohol fuels, such as methanol and ethanol, can be readily reformed to hydrogen gas, but are also not widely available. Petroleum distillate fuels such as gasoline, diesel, Jet A, JP-8, and kerosene, are widely distributed and readily available, have higher specific heating values than alcohol fuels, and can be reformed to hydrogen gas for use in fuel cells using a variety of methods, including partial oxidation, steam reforming, and autothermal reforming. Of all-available reforming methods, steam reforming of distillate fuels is preferred, because it provides the greatest hydrogen yield with no nitrogen dilution, and because steam reforming does not require use of an air compressor, thus allowing for greater overall reforming efficiency and more compact system design.

Conversion of a liquid distillate fuel to hydrogen by steam reforming involves vaporization of the fuel feed and mixing of the fuel vapor with steam, followed by passage of the steam/fuel mixture over a catalytic surface, on which hydrocarbon molecules in the fuel feed undergo a series of reactions with steam molecules, resulting in hydrogen and carbon dioxide products, with lesser amounts of methane and carbon monoxide.

While distillate fuels are more widely distributed than alcohol fuels or natural gas, they also present some unique complications in steam reforming processes. Specifically, coke formation and sulfur poisoning are two common problems in steam reforming of distillate fuels.

Coking of the reforming catalyst surface may result from imperfect mixing of fuel vapor and steam at the reforming reactor inlet. Imperfect mixing leads to gradients in temperature and steam/carbon ratio over the catalyst surface, with coke formation occurring in those regions where temperature or steam/carbon ratios are low.

Steam reforming of aromatic hydrocarbon species is generally more likely to lead to coke formation than reforming of aliphatic hydrocarbons, and heavier hydrocarbons are more likely to form coke than lighter hydrocarbons. Coke formation initially causes lowered catalyst activity, and ultimately can lead to plugging of the reforming reactor. Increasing the steam/carbon ratio of the steam/fuel mixture can diminish coking; however, this results in wasted steam and lower overall process efficiency.

Coke accumulation can also occur during vaporization of the distillate fuel feed. Heavier distillate fuels such as JP-8, kerosene, and diesel normally contain a significant amount of nonvolatile hydrocarbons, which may accumulate and gradually decompose to coke in the vaporization chamber of a reforming apparatus. JP-8, for example, may contain up to 1.5 volume percent nonvolatile residue, which could rapidly accumulate in a vaporization chamber. Coke accumulation due to decomposition of nonvolatile hydrocarbon species in the vaporization chamber of a reforming apparatus could be diminished or eliminated if the apparatus were designed to provide for continuous separation and removal of nonvolatiles from the process stream.

All ordinary distillate fuels contain some amount of sulfur, which may be present as a range of organosulfur compounds, including alkyl sulfides and disulfides, alkyl mercaptans, and substituted or unsubstituted thiophenes, benzothiophenes, and dibenzothiophenes. All of these sulfur species are capable of poisoning reformer and fuel cell system components. Sulfur species present in the fuel feed can be removed upstream of the steam reforming reactor by adsorption. However, the adsorption capacities of conventional adsorbents such as zinc oxide vary significantly from one organosulfur species to another. Hydrogen sulfide is readily adsorbed, while alkyl sulfides are more difficult to remove, thiophenes more difficult still, and substituted benzothiophenes are highly stable and only weakly adsorbed. Direct desulfurization of the liquid distillate fuel feed to acceptable sulfur concentrations using conventional adsorbents may therefore require impractically large adsorbent beds. More effective sulfur removal could be achieved if all of the sulfur in the distillate fuel feed could be converted to hydrogen sulfide prior to desulfurization using adsorbent beds.

All distillate fuels contain both aliphatic and aromatic hydrocarbon compounds. Typically, the aromatic content of a distillate fuel comprises between 15 and 40 weight percent. Steam reforming of distillate fuels necessarily involves several endothermic processes, including steam generation from liquid water, vaporization of the liquid fuel feed, and the steam reforming chemical reactions. In conventional steam reforming systems, the heat required to drive these endothermic processes is supplied by combusting some portion of the fuel feed. The thermodynamics of the reforming process require that at least 30% of the fuel feed be combusted to balance the heat requirements of steam reforming the other 70%. However, indiscriminate combustion of the fuel feed is thermally inefficient, because hydrogen-rich aliphatic species in the feed are combusted along with hydrogen-poor aromatic species. Aliphatic hydrocarbon compounds have higher hydrogen/carbon ratios than aromatics, so that steam reforming of aliphatics produces more hydrogen than steam reforming of aromatics. Conversely, aromatic hydrocarbon compounds require less air for stoichiometric combustion, and so are more advantageously used as combustion fuels. Greater overall thermal efficiency of the reforming process could be achieved if the aromatic content of the feed could be preferentially combusted, while the aliphatic content of the feed is preferentially steam reformed.

Processes and apparatus for steam reforming of hydrocarbon fuels are well known. The prior art discloses a considerable variety of reforming process designs, some of which use fractionator or catalytic cracking reactor components to pretreat the hydrocarbon fuel feed. For example, U.S. Publication No. U.S. 2002/0031690 to Shimazu et al., discloses a fuel reforming apparatus, which may include an autothermal cracking unit, in which the cracking process is accomplished using partial oxidation to provide the thermal energy needed for thermally cracking the fuel. Gas/liquid separation is not used to separate light hydrocarbons from uncracked residue downstream from the cracking reactor, making the Shimazu process unsuitable for use with middle distillate fuels such as diesel, kerosene or JP-8 which contain significant amounts of higher molecular weight aromatic species. U.S. Pat. No. 6,254,839 to Clawson et al., discloses an apparatus for converting hydrocarbon fuel into hydrogen gas and carbon dioxide. Because the heavy fractions are difficult to reform, this apparatus may include a fractionator component, which separates the hydrocarbon fuel feed into heavy and light fractions. The heavy fractions are subsequently sent to a partial oxidation zone while the light fractions are heated in an adjacent zone. The two fractions are then remixed in a mixing zone, and the entire mixture directed to a reforming zone. In both of these prior art examples, all sulfur present in the hydrocarbon fuel feed must be removed by adsorption, and the oxidation and reforming processes are not segregated, so that a pressurized oxygen source is required, and any nitrogen introduced along with the oxygen dilutes the final product gas.

SUMMARY OF THE INVENTION

The present invention has been made in light of the aforementioned problems associated with steam reforming of distillate fuels. A broad object of the present invention is to provide a novel method and apparatus for steam reforming of liquid distillate fuels with high overall process thermal efficiency and compact overall dimensions.

A more specific object of the present invention is to provide for steam reforming of distillate fuels in as compact an apparatus as possible by minimizing the amount of sulfur and aromatic hydrocarbon directed to desulfurization and reforming operations, and by using microchannel heat exchangers and reactors assembled in slab configurations.

Another specific object of the present invention is to provide for steam reforming of distillate fuels while avoiding coke formation, which can cause plugging of apparatus flow channels and deactivation of catalysts.

A further object of the preset invention is to provide effective sulfur removal from sulfur-containing distillate fuel feedstocks prior to steam reforming operations.

A still further object of the present invention is to provide a steam reforming process that, through fractionation followed by catalytic cracking and gas/liquid separation, obviates the problems caused by the existence of nonvolatile components in distillate fuel feed.

Another object of the present invention is to provide for steam reforming with significantly reduced coke formation by catalytically cracking the distillate fuel feed to light hydrocarbon gases prior to mixing with steam, and by reducing the aromatic content of the distillate fuel feed prior to steam reforming.

A yet further object of the present invention is to provide a fuel processor in which the amount of sulfur that must be adsorbed is minimized through partial evaporation of the fuel feed prior to desulfurization, thus decreasing the size of the adsorbent beds needed for either single use or regenerable desulfurization.

A still further object of the present invention is to provide a fuel processor in which residue streams from the partial evaporation and cracking operations are combusted, destroying the most problematic portion of the fuel feed while providing efficient overall thermal management.

In accordance with the above objects, the present invention is directed to a fuel processor for conversion of distillate fuel feedstocks to hydrogen-rich product gas by steam reforming. The processor includes at least one assembly for separation of the fuel feed into a sulfur-depleted and aliphatic-rich light gas stream, and a sulfur- and aromatic-rich residual liquid stream, at least one assembly for desulfurization of the gas process stream exiting the gas/liquid separator component of the separation assembly, at least one assembly for steam reforming of the desulfurized gas process stream exiting the desulfurization assembly, and at least one combustion assembly for generation of heat by combustion of some mixture of a portion of the distillate fuel feed stream with the liquid residue stream exiting the separation assembly.

In operation, a distillate fuel feed stream is directed into the separation assembly, in which the fuel is converted and separated into two process streams; a gas stream which is rich in aromatics and depleted in sulfur relative to the feed, and a liquid residue stream which is rich in aliphatic and sulfur relative to the feed. The liquid residual stream is directed to the combustion assembly, where it may be mixed with fresh fuel feed, then mixed with air and combusted in at least one combustion process, which liberates heat required for endothermic process operations within the fuel processor. The gas stream from the separation assembly is directed first to the desulfurization assembly, where hydrogen sulfide is removed by adsorption, and then to the reforming assembly, in which the desulfurized gas is mixed with steam and converted in a reforming reactor to produce a hydrogen-rich product stream.

Components of the apparatus for separation of the fuel feed stream into gas and liquid streams may include any or all of a vaporizer, a fractionator, a catalytic cracking reactor, and a gas/liquid separator. The catalyst used in the catalytic cracking reactor is chosen to have high activity for cracking of aliphatic species in the feed to light gases, high activity for conversion of organosulfur species in the feed to hydrogen sulfide, and low selectivity for coke formation. A preferred catalyst formulation having the above properties consists of oxides and/or sulfides of manganese supported on γ-alumina.

Components of the apparatus for desulfurization of the aliphatics-rich gas stream may include any or all of a high temperature adsorber, a low temperature adsorber, and apparatus for regeneration of the adsorbers.

Components of the apparatus for reforming the desulfurized gas stream to hydrogen-rich product may include a steam generator, a reforming reactor, a membrane purifier, and a water recovery component.

The apparatus for combustion of the liquid residue stream may include an air blower, a radiant burner, a catalytic combustion reactor, and a water recovery component. A preferred catalyst formulation for catalytic combustion of the liquid stream consists of oxides of copper and vanadium modified with potassium cation, supported on refractory γ-alumina.

Through the disclosed combination of partial evaporation, catalytic cracking using manganese on alumina, adsorption of hydrogen sulfide from the cracked gas product using high and low temperature zinc oxide, and combustion of the residual liquid from the evaporation and cracking processes, the present invention provides a highly effective system and method for integrating liquid fuel desulfurization and thermal management within a compact distillates fuel reforming process.

The objects and features of the invention listed above will become more apparent from the following detailed description of the preferred embodiments and accompanying drawings forming a part hereof, wherein like numerals refer to like parts throughout.

DETAILED DESCRIPTION OF THE INVENTION

The features and principles of the present invention are described in detail below, with reference to the indicated figures. In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Heat flows, heat exchangers, pumps, and other ancillary equipment are not shown in the schematic figures. The particular embodiments of the invention are presented as examples of the invention, and should not be understood as limitations of the invention. A person skilled in the art may readily see that various configurations of heat exchangers, pumps, and other standard processing equipment may be employed to achieve the required process stream temperatures and pressures while maximizing the overall process thermal efficiency. The novel features of the invention can be employed as numerous embodiments within the scope of the invention.

Figure 1:
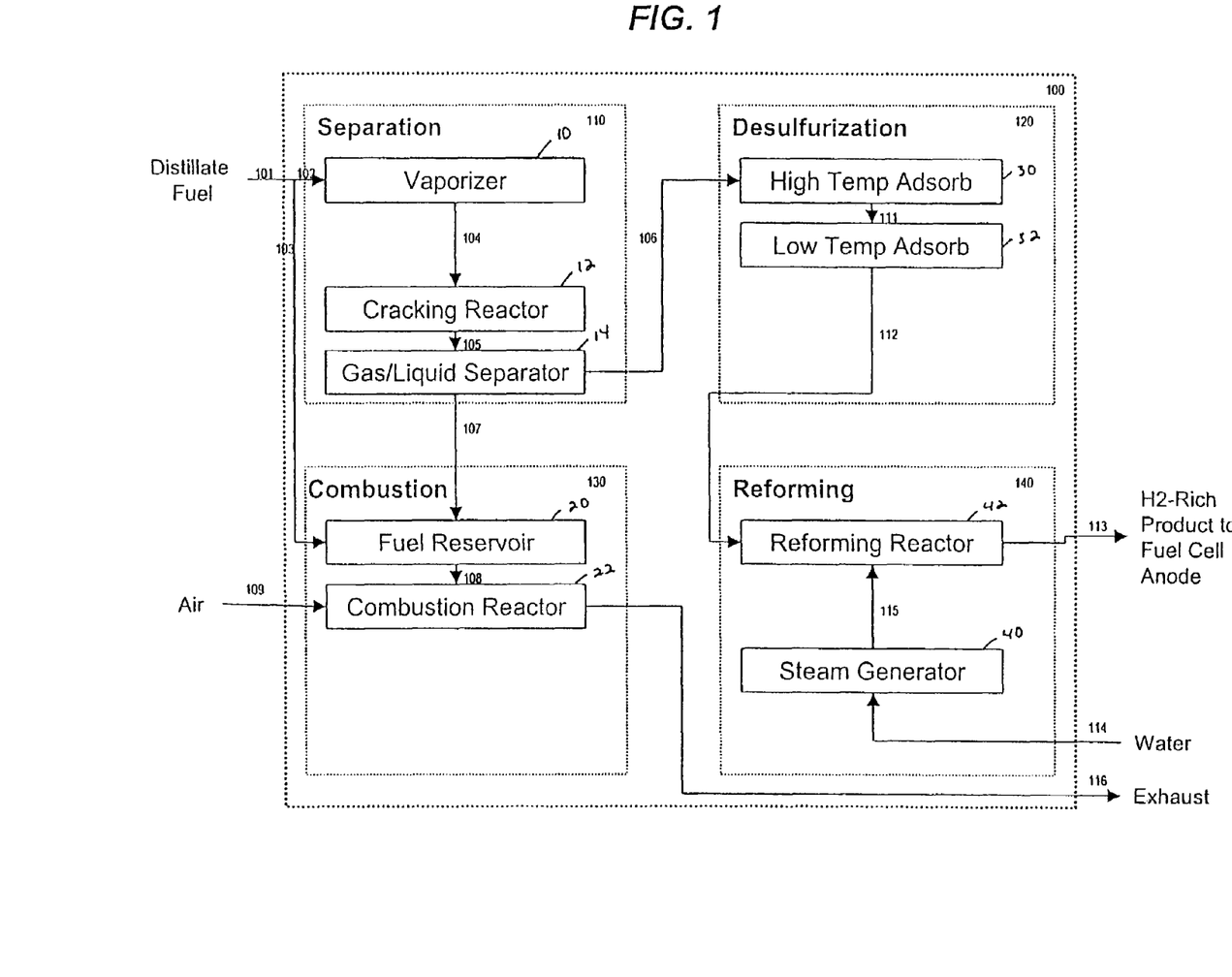
FIG. 1 is a schematic process flow diagram depicting the relationships of the assemblies, components, and material process streams of a distillate fuel reforming apparatus, in accordance with a first embodiment of the present invention.

A first embodiment of the present invention, a schematic process flow diagram of which is shown in FIG. 1, is an apparatus 100 comprising four distinct assemblies, namely a separation assembly 110, a desulfurization assembly 120, a combustion assembly 130, and a reforming assembly 140. In this embodiment, the separation assembly 110 includes a fuel vaporizer 10, a catalytic cracking reactor 12 and a gas/liquid separator 14.

A distillate fuel feed stream 101 is split into a vaporizer feed stream 102, and a combustion fuel makeup stream 103. A vaporized and superheated fuel stream 104 is directed from the vaporizer 10 to the catalytic cracking reactor 12 in which the aliphatic content of the fuel is selectively cracked to light hydrocarbon gases while, at the same time, any sulfur present in the fuel as organosulfur species is converted to hydrogen sulfide. The aromatic content of the fuel remains largely unconverted. The catalyst contained in the catalytic cracking reactor 12 is chosen to provide high activity for cracking of aliphatic species in the feed to light gases, high activity for conversion of organosulfur species in the feed to hydrogen sulfide, and low selectivity for coke formation. An example of a suitable catalyst is 10 to 15 weight percent manganese supported on γ-alumina, with the manganese present as oxides, sulfides, or a mixture of these. Vaporization, superheating, and catalytic cracking of the fuel are endothermic processes and are supplied with heat from the combustion assembly 130, which includes a combustion fuel reservoir 20 and a combustion reactor 22.

The cracking reactor product stream 105 is directed to the gas/liquid separator 14 operating at a controlled temperature and pressure such that a specified fraction of stream 105 is separated out as a gas stream 106 which is directed to the desulfurization assembly 120, while the remainder is a condensed liquid stream 107 which is directed to the combustion assembly 130. Stream 106 is sent to a high temperature adsorption component 30 of the desulfurization assembly 120, in which a first stage of hydrogen sulfide adsorption occurs. The partially desulfurized stream 111 is then directed to a low temperature adsorption component 32, in which a second stage of hydrogen sulfide adsorption occurs. The desulfurized gas stream 112 exiting the low temperature adsorption component 32 is directed to the reforming assembly 140.

The condensed liquid stream 107 exiting the gas/liquid separator 14 is directed to the fuel reservoir component 20 in the combustion assembly 130. The accumulation of excess fuel in the fuel reservoir component is avoided through control of the operating temperature and pressure of the gas/liquid separator 14 of the separation assembly 110. The fuel reservoir component 20 maintains a controlled level of liquid combustion fuel by drawing a fresh fuel stream 103 as needed. Liquid level control in the fuel reservoir may be achieved using any combination of liquid level switches, solenoid valves, pumps, and electronic control apparatus.

At least one combustion reactor component 22 generates heat needed for each endothermic process operation by combusting a mixture of fuel 108 from the fuel reservoir 20 and an air feed stream 109. Combustion reactor components may include open flame burners, radiant burners, catalytic combustion reactors, or catalytically supported radiant burners. An exhaust (flue gas) stream 116 from the combustion process containing carbon dioxide, nitrogen, water, excess oxygen, carbon monoxide, and uncombusted hydrocarbon species is vented to the ambient as a byproduct.

In the reforming assembly 140 of the apparatus, a water-feed stream 114 is directed to a steam generator component 40, which produces a steam stream 115. The desulfurized hydrocarbon gas stream 112 and the steam stream 115 are mixed in a catalytic steam reforming reactor component 42 and converted to a hydrogen-rich product stream 113, which contains hydrogen, carbon dioxide, methane, carbon monoxide, and other trace species. The reforming reactor 42 contains a catalyst, which is chosen to have high activity for steam reforming and water gas shift reactions, and low selectivity to coke. A variety of metal active phases supported on refractory carriers exhibit the desired catalytic properties for hydrocarbon steam reforming, including metals such as nickel, cobalt, platinum, palladium, rhodium, ruthenium, and iridium, on supports such as alumina ceria, silica, magnesia, or any combination of these, with or without alkali promoters such as potassium. Steam generation and steam reforming reactions are endothermic processes that use heat supplied from the combustion assembly 130.

Figure 2:
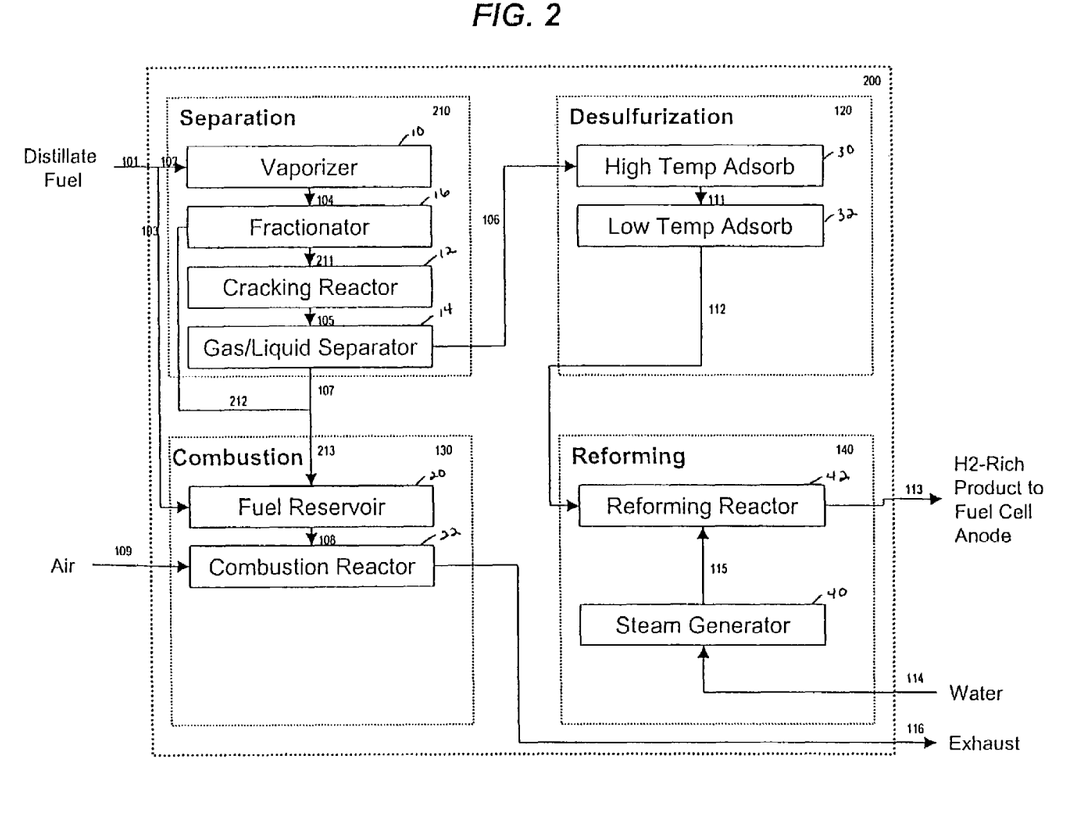
FIG. 2 is a schematic process flow diagram depicting the distillate fuel reforming apparatus including a fuel fractionator in the separation assembly, in accordance with a second embodiment of the present invention.

A second embodiment of the invention, a schematic of which is shown in FIG. 2, is a reforming apparatus 200, which retains the assemblies and components of the first embodiment, but also includes a fuel fractionator component 16 in the separation assembly 210. In this embodiment, a vaporized and superheated fuel vapor stream 104 exiting the vaporizer component 10 is directed to the fractionator component 16, within which the fuel vapor is separated to the required thermodynamic ratio into a heavy liquid residue stream 212, and a light vapor stream 211. The fuel fractionator component 16 may include any one of various designs of plate or packed column distillation apparatus in which a multicomponent vapor stream is rectified vapor-liquid contacting to produce a liquid stream enriched (relative to the feed) in heavy, high boiling species, and a vapor stream enriched in light, low boiling species.

The vapor stream 211 from the fractionator component 16 is directed to the cracking reactor 12, which operates as previously described for the first embodiment. The heavy liquid residue stream 212 from the fractionator 16 is mixed with the liquid stream 107 exiting the gas/liquid separator 14, and the mixture is directed to the fuel reservoir component 20 of the combustion assembly 130.

Figure 3:
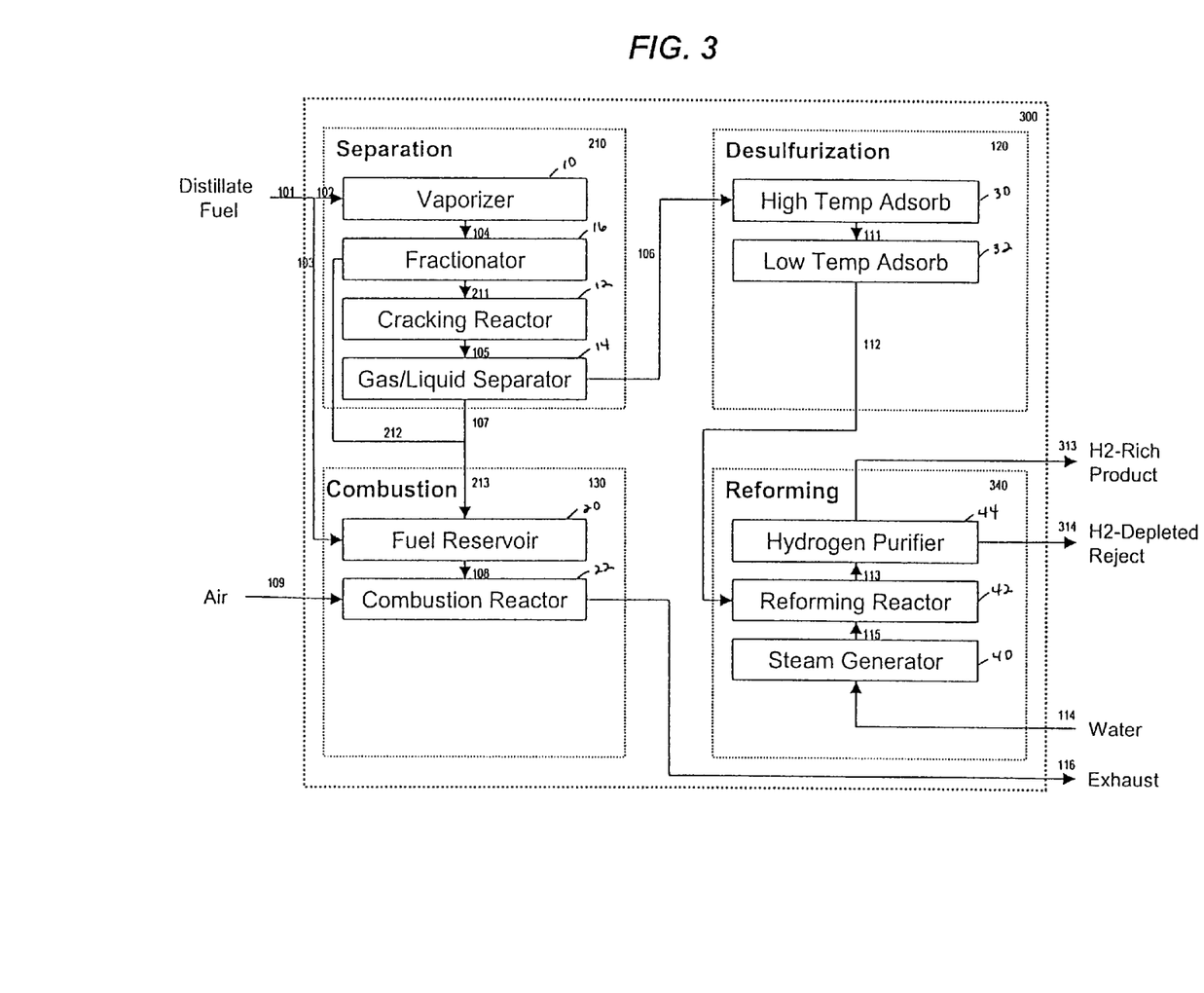
FIG. 3 is a schematic process flow diagram depicting the distillate fuel reforming apparatus including a hydrogen purifier in the reforming assembly, in accordance with a third embodiment of the present invention.

A third embodiment of the invention, a schematic of which is shown in FIG. 3, is a reforming apparatus 300 which retains the assemblies and components of the second embodiment, but also includes a hydrogen purifier component 44 in the reforming assembly 340. In this embodiment, a hydrogen-rich product stream 113, which contains hydrogen, carbon dioxide, methane, carbon monoxide, and other trace species, is directed from the reforming reactor 42 to the hydrogen purifier component 44, in which hydrogen is selectively separated into a hydrogen-rich product stream 313, and a hydrogen-depleted reject stream 314 which is directed to the combustion reactor 22. The hydrogen purifier component 44 may include any of several hydrogen separation apparatuses, including a dense palladium membrane, a porous polymer or ceramic membrane, or a pressure-swing adsorption process. The hydrogen purifier 44 may also include any of several catalytic reactors, including low temperature gas shift, preferential oxidation, or methanation reactor.

Figure 4:
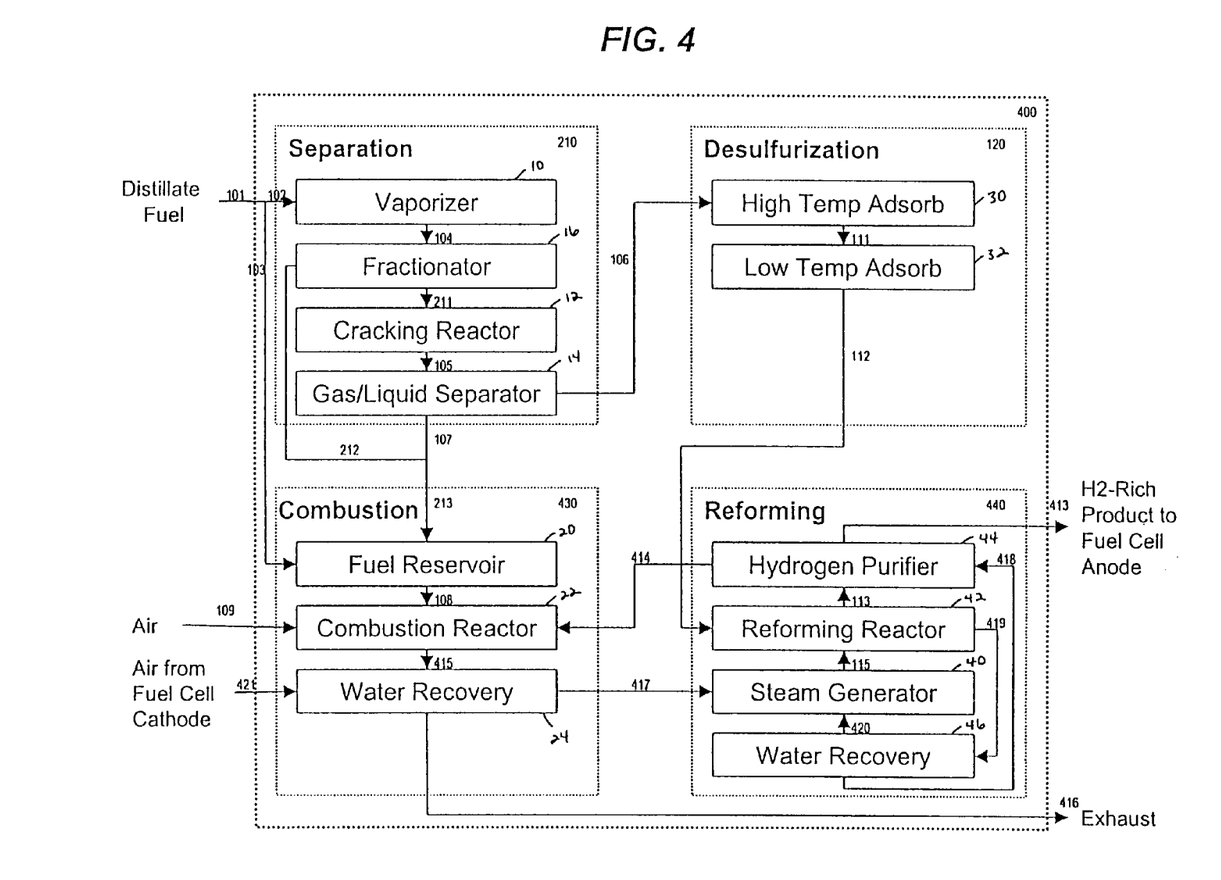
FIG. 4 is a schematic process flow diagram depicting the distillate fuel reforming apparatus including water recovery components in the combustion and reforming assemblies, in accordance with a fourth embodiment of the present invention.

A fourth embodiment of the invention, a schematic of which is shown in FIG. 4, is a reforming apparatus 400 which retains the assemblies and components of the third embodiment, but also includes water recovery components 24, 46 in the combustion assembly 430 and the reforming assembly 440, respectively. In this embodiment, a wet exhaust stream 415 from the combustion reactor 22 of the combustion assembly 430 and a humid air fuel cell cathode off-gas stream 421 are directed to a water recovery component 24, in which water is recovered in a condensed liquid stream 417, which is directed to the steam generator component 40 of the reforming assembly 440. A dry exhaust stream 416 exiting the water recovery component 24 is vented to the ambient as a byproduct.

Excess steam present in a wet reformate stream 419 exiting the reforming reactor 42 is also recovered in a water recovery component 46 of the reforming assembly 440. The recovered water stream 420 is directed to the steam generator 40, while a dry reformate steam 418 is directed to the hydrogen purifier component 44. A dry hydrogen-depleted reject stream 414 exiting the hydrogen purifier 44 is directed to the combustion reactor 22 of the combustion assembly 430. A dry hydrogen-rich product stream 413 exits the reforming apparatus 400. The water recovery components of the combustion assembly 430 and the reforming assembly 440 may include any of various continuous water condensing apparatus, including heat exchangers or turbine compression equipment, or may include reversible water adsorption apparatus containing adsorbents such as molecular sieves or anhydrous sodium sulfate.

The fractionator component 16 of the separation assembly 210 in the second, third, and fourth embodiments of the invention, as described above, can be operated at any controlled vapor temperature within the range from 100 to 350° C. and vapor pressure between 0.1 and 10 atmospheres, such that a desired vapor fraction of the fuel feed is obtained. Depending on the composition of the distillate fuel feed stream 101 and the vapor fraction produced, the stream 211 exiting the fractionator 16 may be partially desulfurized relative to the fuel feed.

Sulfur removal by the fractionator may decrease the size of hydrogen sulfide adsorbent components of the desulfurization assembly 120. FIG. 5 is a series of graphs showing hydrocarbon and organosulfur distributions in (a) gasoline, (b) diesel, (c) JP-8, and (d) kerosene. These distributions were determined by gas chromatographic (GC) simulated distillation analyses of typical fuel samples, using pulsed flame photometric detection (PFPD) to simultaneously determine carbon and sulfur response. The distributions show PFPD response plotted against GC retention time, which is an indication of boiling temperature. FIGS. 5(*a*), 5(*b*), and 5(*c*) clearly show that organosulfur content in diesel, kerosene, and JP-8, respectively, are all skewed toward the higher end of the hydrocarbon boiling point ranges.

The thermodynamics of steam reforming require that approximately one-third of distillate fuel feed must be combusted to balance the heat demands of reforming the other two-thirds. Fractionation of the fuel feed may therefore reduce the sulfur content of the steam-reformed portion without reducing the overall thermal efficiency of the reforming process. In the JP-8 analysis shown in FIG. 5(c), for example, the dashed vertical line represents the division between the lower boiling two-thirds and the higher boiling one-third of the carbon mass. The low boiling portion of the distribution, below 150° C. ($C_9$ of the carbon distribution), comprises less than 1% of the total sulfur, and is mostly thiols. Between $C_9$ and the two-thirds cutoff point of the total hydrocarbon mass (to about 200° C. or between $C_{11}$ and $C_{12}$), are found alkyl sulfides, disulfides, and substituted thiophenes. These compounds comprise about 15% of the total sulfur. Making up the remaining 85% of the total sulfur are higher boiling alkyl-substituted thiophenes, benzothiophenes, and dibenzothiophenes.

The $C_1$, $C_2$, and $C_3$ alkyl substituted benzothiophenes elute chromatographically in the boiling range of 200° C. to 300° C. ($C_{13}$ through $C_{18}$). While all the compounds have the potential to poison precious metal in fuel processor components, alkyl sulfides and thiophenes are relatively easy to remove from process streams using catalytic cracking combined with adsorbents such as zinc oxide. In contrast, benzothiophene and dibenzothiophene compounds are more resistant to conventional cracking and desulfurization processes.

Figure 5A:
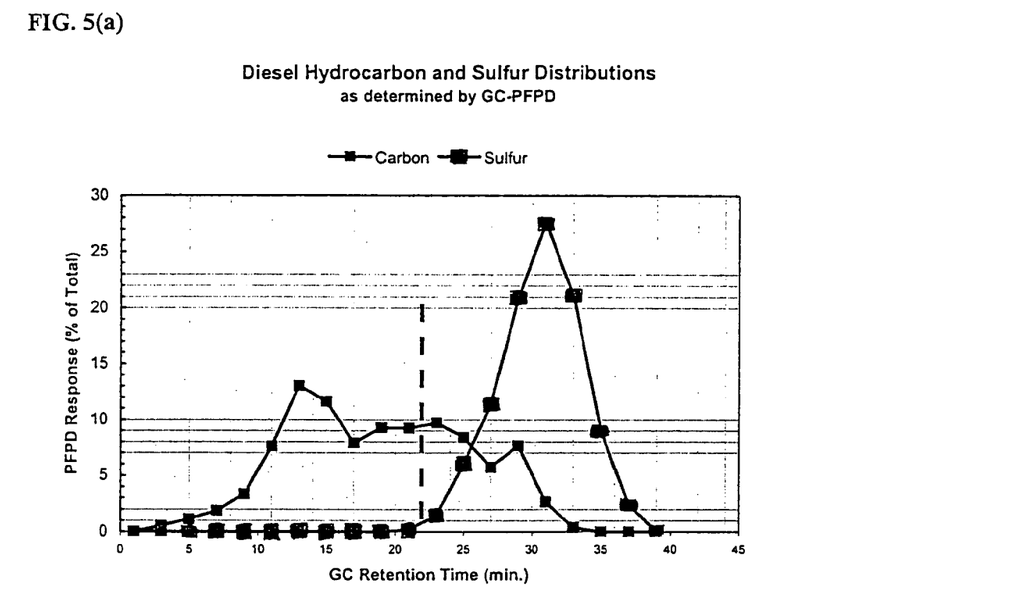
FIG. 5 is a series of graphs showing hydrocarbon and organosulfur distributions in (a) diesel, (b) kerosene, (c) JP-8, and (d) gasoline, as determined by GC-PFPD.
Figure 5B:
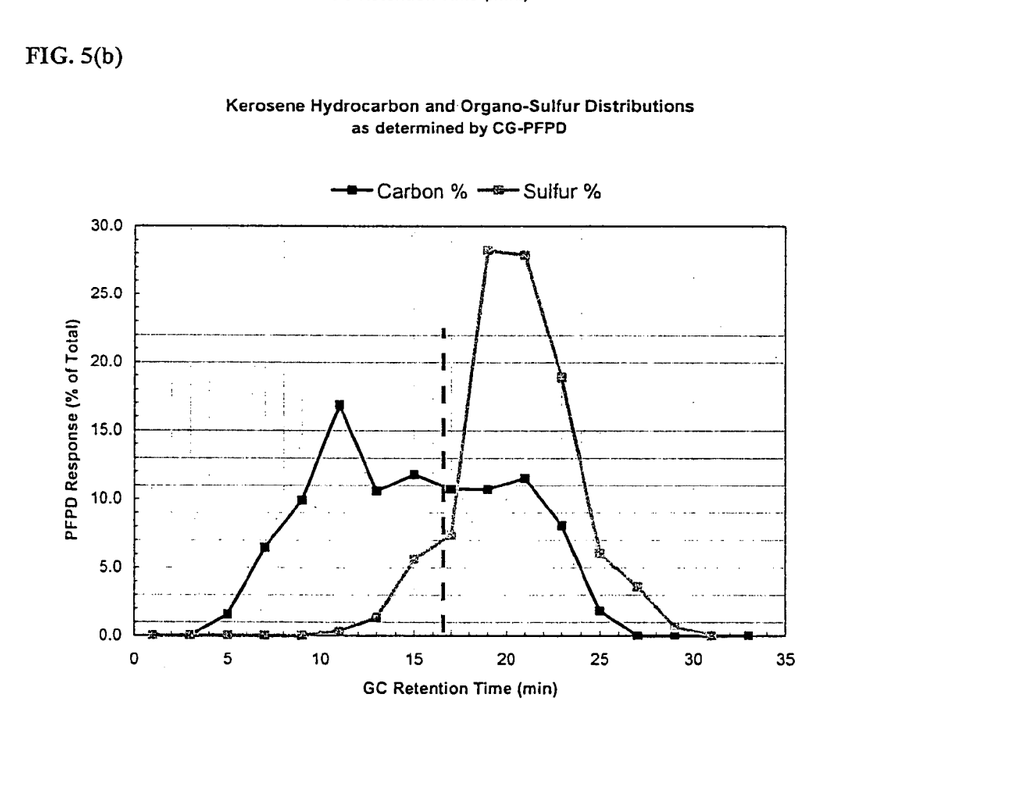
Figure 5C:
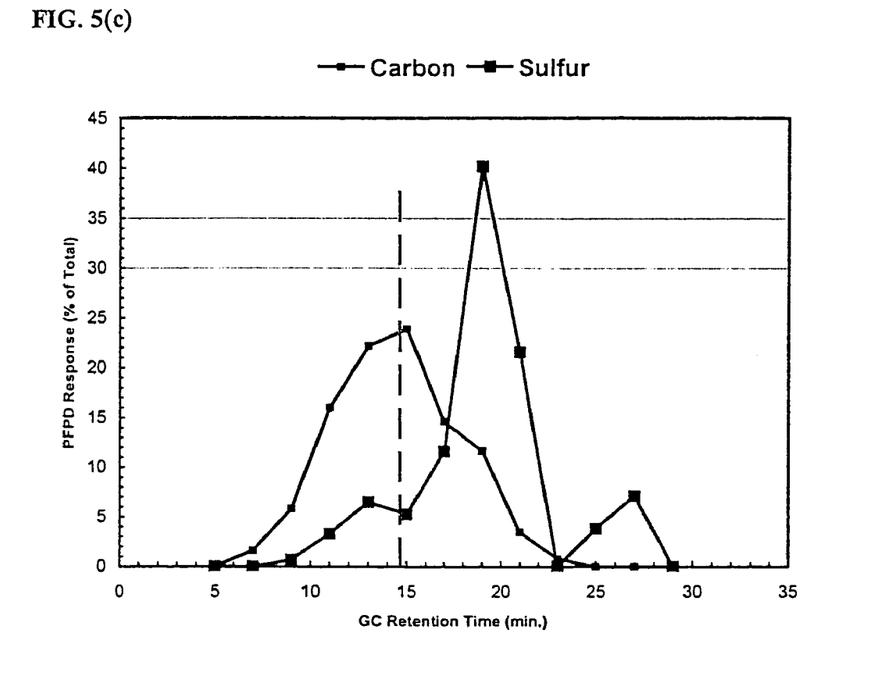
Figure 5D:
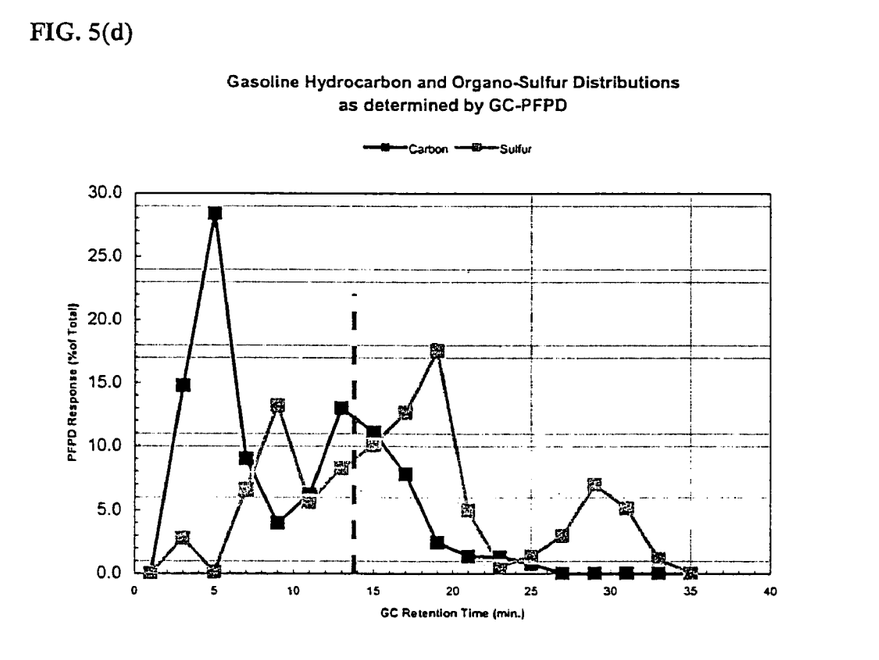

Fractionation of diesel, kerosene, or JP-8 prior to catalytic cracking using reforming schemes such as those exemplified in the second, third, and fourth embodiments of the invention described above, reduces the size of the cracking reactor component 12 of the separation assembly 210, and of the desulfurization assembly 120 in FIGS. 2, 3, and 4. Fractionation of fuels such as diesel, kerosene, or JP-8 also provides for continuous separation and removal of nonvolatile species that are normally present in these fuels, thereby avoiding coke accumulation in the vaporizer component. FIG. 5(d), on the other hand, shows that the sulfur present in gasoline is distributed more evenly through the hydrocarbon boiling range. The first embodiment of the invention shown in FIG. 1, in which a fractionator component is absent from the separation assembly 110, would therefore be a more suitable apparatus for gasoline steam reforming.

Catalytic cracking of distillate fuels using an appropriate catalyst, followed by gas/liquid separation at a specified, controlled temperature and pressure, achieves three desired effects. First, the aliphatic hydrocarbon content of the fuel is preferentially cracked to produce a gas stream with a higher hydrogen/carbon ratio than the fuel feed and directed to steam reforming operations, while the aromatic content remains relatively unconverted, to be separated out as a liquid stream with lower hydrogen/carbon ratio than the fuel feed and directed to combustion operations. Second, organosulfur species present in the fuel feed are rapidly converted to hydrogen sulfide, which is more readily removed by adsorption. Third, the desulfurized gas stream may be steam reformed using a lower steam/carbon ratio, without coke accumulation in the reforming reactor, thus improving the overall process thermal efficiency. Conventional petroleum cracking catalysts, such as acidic zeolite catalysts used in fluidized catalytic cracking (FCC) processes, exhibit high selectivity to coke and low selectivity for cracking of aliphatic versus aromatic hydrocarbons, and so would be inappropriate for the purposes of the present invention.

Figure 6A:
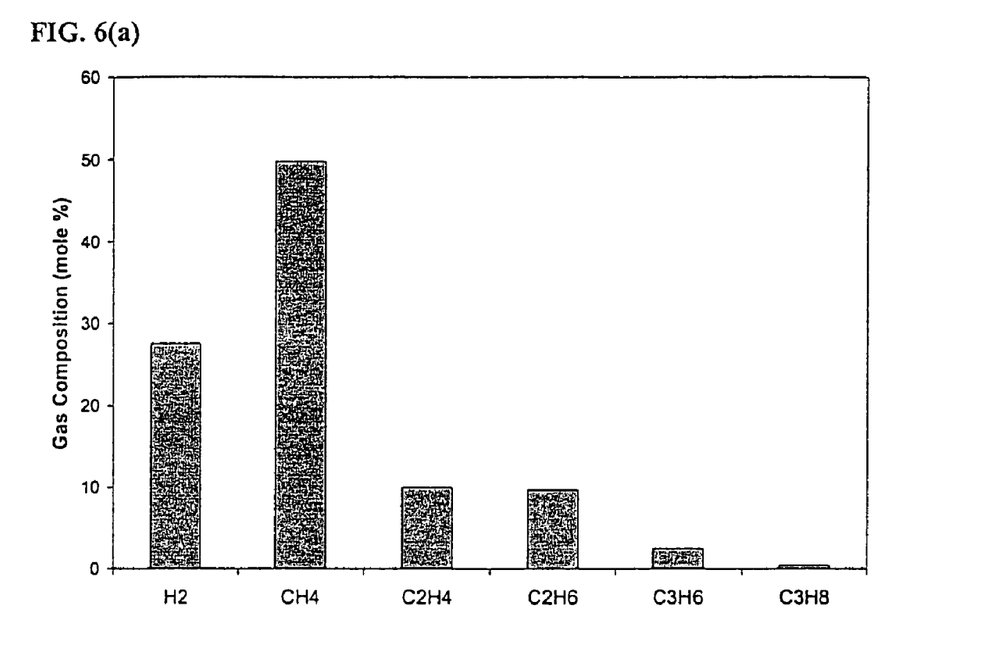
FIG. 6 is a graph showing the compositions of the (a) gas and (b) liquid streams obtained from JP-8 catalytic cracking using an 11 weight percent manganese on γ-alumina catalyst at 643° C. and 1 atm followed by gas/liquid separation at 30° C. and 1 atm.
Figure 6B:
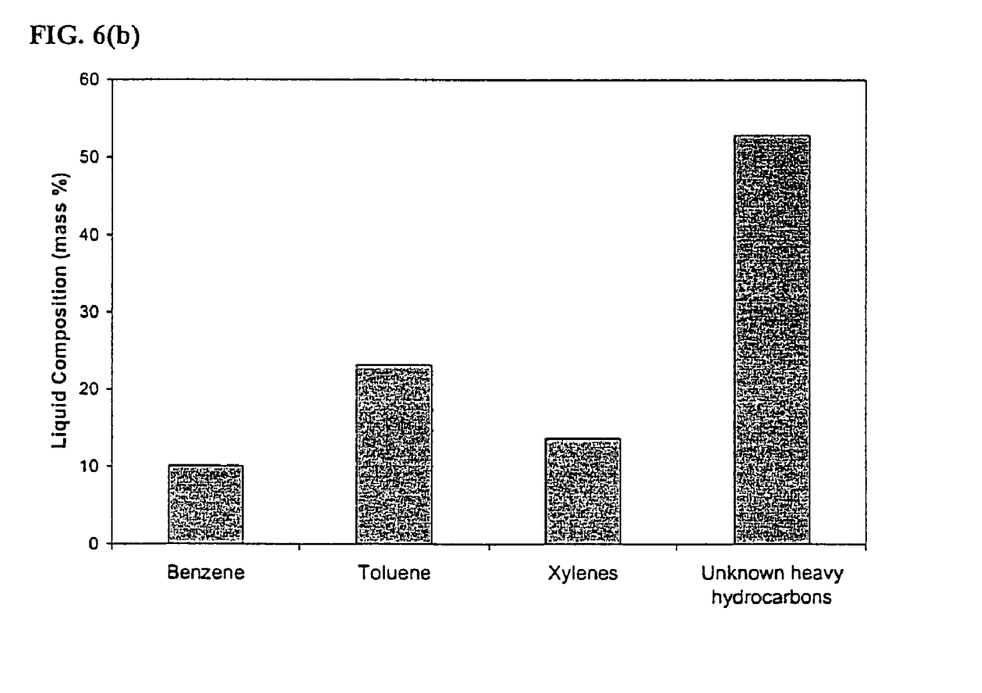

An example of an appropriate catalyst formulation which is capable of producing the three desired effects listed above without coke accumulation is composed of 10 to 15 weight percent manganese supported on γ-alumina, in which manganese is present on the support as oxides, sulfides, or some mixture of these. FIGS. 6(a) and 6(b) show the compositions of the gas and liquid streams, respectively, obtained by catalytic cracking of JP-8 using a catalyst comprising 11 weight percent manganese supported on γ-alumina, with cracking reactor temperature of 643° C. and pressure of 1 atm, followed by gas/liquid separation at 30° C. and 1 atm. The gas stream obtained under these steady operating conditions represented 82 weight percent of the feed. The gas stream, as shown in FIG. 6(a), contained primarily methane ($CH_4$), with lesser amounts of hydrogen ($H_2$), ethylene ($C_2H_4$), ethane ($C_2H_6$), propylene ($C_3H_6$), and propane ($C_3H_8$). The molar hydrogen/carbon ratio of this gas stream was more than 10% higher than that of the JP-8 feed. The light aliphatic hydrocarbon species present in the gas stream may be readily converted to hydrogen in steam reforming operations, using a lower steam/carbon ratio, and with less coke yield, than if the JP-8 feed were to be steam reformed directly. The liquid stream, which represented 18 weight percent of the feed, was composed of benzene, toluene, xylene isomers, and unidentified heavier hydrocarbon species, as shown in FIG. 6(b). The unidentified heavy hydrocarbon species may include naphthalenes and other polycyclic aromatic hydrocarbons. The more stable aromatic hydrocarbon species which make up the liquid stream would be difficult to convert to hydrogen in steam reforming operations, due to slow reaction kinetics and low hydrogen/carbon ratio, but may be readily converted in the high temperature oxidizing environment of the combustion operations to yield process heat.

Combustion of the liquid fuel stream 108 exiting the fuel reservoir component of the combustion assembly 130 in FIGS. 1, 2, and 3, or 430 in FIG. 4, can be accomplished by means of various apparatuses. After mixing with air stream 109, fuel can be combusted in an open flame burner, also known as a blue flame burner, in which heat is transferred convectively from the flame to process streams by the burner flue gas. Alternatively, the air/fuel mixture can be combusted in a radiant burner, in which heat produced by combustion reactions occurring within the pores of a refractory burner element is transferred by radiation from the burner element to process streams.

Another alternative is to produce heat by combustion of the air/fuel mixture within a catalytic combustion reactor, in which the combustion reactions occur on or near the surface of a solid-phase catalyst. Heat produced in a catalytic combustion reactor may be transferred to process streams by convection, conduction, radiation, or any combination of these. An advantage of the use of catalytic combustion in a compact distillate fuel processor such as the present invention is the ability to assemble the combustion reactor catalyst in close physical contact with endothermic process operations, thus minimizing heat transfer resistance within a highly compact apparatus.

Figure 7:
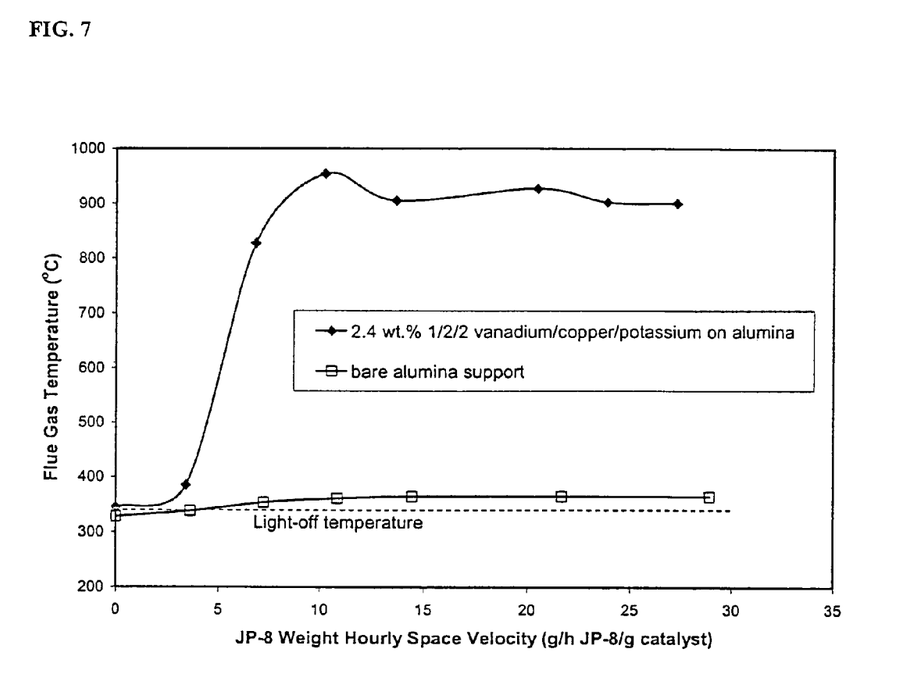
FIG. 7 is a graph showing a range of flue gas temperatures that may be obtained by catalytic combustion of JP-8 using a 2.4 weight percent 1/2/2 vanadium/copper/potassium on γ-alumina catalyst at various JP-8 weight hourly space velocities.

An effective combustion catalyst must provide for efficient conversion of distillate fuel within a controlled temperature range, and must achieve light off reliably at low initial temperature. An example of a catalyst formulation that provides these properties consists of vanadium/copper/potassium with 2 to 20 weight percent total metal loading on a γ-alumina support. FIG. 7 shows the range of measured flue gas temperatures that were obtained during catalytic combustion of JP-8 in air at near-ambient pressure using bare alumina and vanadium/copper/potassium, 1/2/2 molar ratio, 2.4 weight percent loading on γ-alumina. Both catalysts were heated using an electric resistance heater to an initiation temperature of approximately 335° C., then fuel/air mixture was introduced, and flue gas exhaust temperature was monitored. Electric heating power was turned off when flue gas temperature was observed to exceed the initiation temperature. The combustion process was then allowed to proceed until a steady flue gas temperature was observed. The vanadium/copper/potassium catalyst was able to achieve stable flue gas temperatures in excess of 900° C. over a wide range of JP-8 feed rates, generating more than 35 watts of heating power per $cm^3$ of catalyst. Because the exothermic combustion and endothermic reforming processes of the present invention are segregated, air for combustion can be supplied by means of compact and efficient low-pressure blowers, regardless of the operating pressure of the reforming reactor, without the use of compressed air or oxygen feed streams, and without nitrogen dilution of the hydrogen-rich product.

The fourth embodiment of the invention, as depicted in FIG. 4, shows a system with water recovery components within the combustion assembly 430 and the reforming assembly 440, such that no water feed stream to the reforming apparatus 400 is necessary. Because water is produced in the combustion reactor component of the combustion assembly 430 and in the fuel cell cathode reaction, the water requirements of the reforming process can be balanced by 68% water recovery in these two water recovery components.

Figure 8:
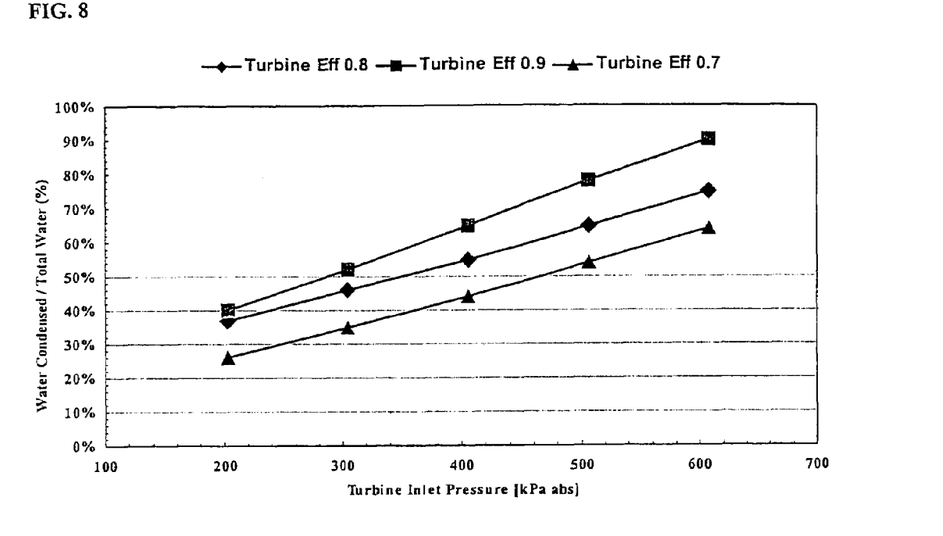
FIG. 8 is a graph showing the impact of turbine efficiency on condensation in water recovery components.

Two approaches can be applied to achieve this water recovery. One uses condensation by cooling the exhaust stream to near ambient temperature, while the other operates by expanding the humid air to atmospheric pressure in a turbine. In both cases the fuel cell stack will operate at elevated pressure and temperature and a water-air separation is applied. In the turbine application, a compressor can be installed on the turbine shaft, to provide fuel cell stack with pressurized air. The expansion energy in the turbine, subsidized with a small motor, enables the compressor to provide compressed air to the fuel cell stack at its operating pressure. FIG. 8 shows turbine efficiency influence on water vapor condensation from the nitrogen enriched humid air. Using a turbine, which is 90% efficient, the fuel cell stack will have to operate at 4.25 atmosphere, while with 80% efficiency, the turbine stack can operate at 5.5 atmospheres. A 70% efficient turbine stack will operate at slightly higher pressure than six atmospheres. Combining both cooling and turbine-compressor designs will result in condensing more than the 68% needed for the reforming process, with the excess added to potable water supply in remote operations.

The first and second embodiments of the invention, as shown in FIGS. 1 and 2, produce a hydrogen-rich product stream, which may be directed to the anode of a solid oxide fuel cell for electric power generation. In a system comprising a distillate fuel reformer such as the present invention, coupled with a solid oxide fuel cell, the anode off-gas stream from the fuel cell may be recycled to the reforming reactor component of the reforming assembly. In this way, excess steam and unreacted hydrogen present in the fuel cell anode off-gas stream are recovered, which may improve the overall process efficiency and reduce or eliminate the need for a steam generator component.

Figure 9:
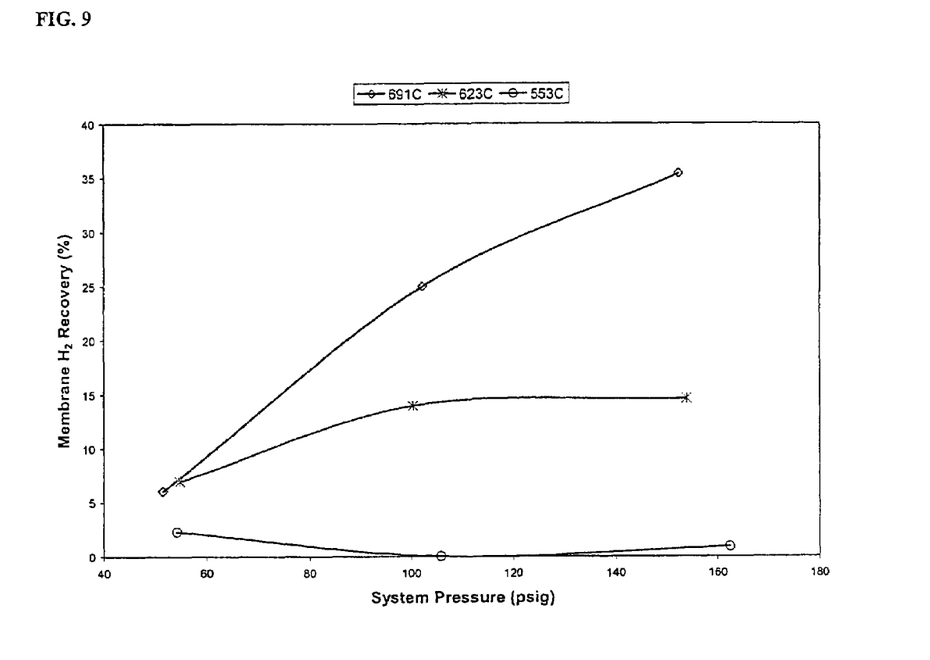
FIG. 9 is a graph showing the impact of temperature and pressure on hydrogen recovery using palladium membrane in the hydrogen purifier component in JP-8 reforming.

Application of the present invention to proton exchange membrane fuel cell systems will require purification of the reformate stream 113 as shown in the third and fourth embodiments of the invention shown in FIGS. 3 and 4. An example of an apparatus suitable for use in the hydrogen purifier component of the reforming assembly 340 of FIG. 3 or 440 of FIG. 4 is a dense palladium membrane. Palladium membrane is permeable to hydrogen with a very high selectivity over permeation of methane, carbon monoxide, carbon dioxide, and water. The recovery of purified hydrogen as membrane permeate depends in part on the operating temperature and the system pressure across the membrane, as shown in FIG. 9. The data shown in FIG. 9 was obtained during JP-8 steam reforming using a reforming apparatus configured in accordance with the third embodiment of the invention shown in FIG. 3. Although the maximum recovery attained using this apparatus was less than 40%, hydrogen recoveries in excess of 80% can be achieved when using greater membrane surface area.

Water recovery from the exhaust streams from proton exchange membrane fuel cells using exhaust stream expansion in the turbine and/or cooling in the heat exchanger may balance the reforming water requirement, eliminating the need for a water feed stream to the fuel processor provided that the fuel cell is operating at 5-7 atmosphere and 160-200° F. Water recovery from the exhaust from solid oxide fuel cells can be achieved by directing the anode off-gas stream to the reforming reactor component of the reformer apparatus, reducing or eliminating the requirement for a steam generator component or a water feed stream to the fuel processor. Finally, the use of microchannel design for heat exchanger and reactor components of the various assemblies of the invention fuel processor, with components assembled in closely conforming slab configurations, can provide for higher overall thermal efficiency and lighter, faster start up, as well as a more compact apparatus than conventional designs.

The foregoing descriptions and drawings should be considered as illustrative only of the principles of the invention. The invention may be implemented in a variety of systems and is not limited to the aircraft scenario of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A compact and efficient fuel processor operating at pressures higher than one atmosphere and temperatures above 300° C. for reforming distillate hydrocarbon fuels containing sulfur to obtain high quality hydrogen product, comprising:

a separation assembly for converting and separating a sulfur-containing distillate fuel feed into an aliphatics-rich and sulfur-depleted gas stream and an aromatics-rich and sulfur-rich liquid stream;

a desulfurization assembly for receiving the aliphatics-rich and sulfur-depleted gas stream exiting the separation assembly and for removing hydrogen sulfide therefrom to output desulfurized gas;

a combustion assembly for receiving said aromatics-rich and sulfur-rich liquid stream exiting the separation assembly and for combusting said liquid stream with air to yield process heat; and a reforming assembly in which process heat from the combustion assembly is used to generate steam and convert the desulfurized gas exiting the desulfurization assembly to a hydrogen-rich stream.

2. The fuel processor as set forth in claim 1, wherein said separation assembly includes:

a fuel vaporizer for generating a vaporized and superheated fuel stream from incoming distillate fuel;

a catalytic cracking reactor for receiving said fuel stream from said fuel vaporizer and selectively cracking an aliphatic content of said fuel stream to light hydrocarbon gases while converting any organosulfur species to hydrogen sulfide; and a gas-liquid separator receiving and separating an output from said cracking reactor into a gas stream directed to said desulfurization assembly and a condensed liquid stream directed to said combustion assembly.

3. The fuel processor as set forth in claim 2, wherein said cracking reactor includes a catalyst that provides high activity for cracking the aliphatic content, high activity for conversion of the organosulfur species to hydrogen sulfide, and low selectivity for coke formation.

4. The fuel processor as set forth in claim 3, wherein the catalyst includes manganese on alumina with 10-15 weight percent loading.

5. The fuel processor as set forth in claim 2, wherein said combustion assembly provides heat to said separation assembly for said vaporization and superheating by said vaporizer and for said catalytic cracking by said cracking reactor.

6. The fuel processor as set forth in claim 2, wherein said separation assembly further includes:

a fractionator for receiving the vaporized and superheated fuel stream and separating said fuel stream into a heavy liquid residue stream and a light vapor stream, said vapor stream being directed to the cracking reactor and said residue stream joining said condensed liquid stream output by said gas-liquid separator.

7. The fuel processor as set forth in claim 2, wherein said desulfurization assembly includes:

a high temperature adsorber for conducting a first stage of hydrogen sulfide adsorption on said gas stream to produce a partially desulfurized gas stream; and a low temperature adsorber for conducting a second stage of hydrogen sulfide adsorption on said partially desulfurized gas stream.

8. The fuel processor as set forth in claim 1, wherein said steam reforming assembly includes:

a steam generator for producing a steam stream; and a catalytic steam reforming reactor for receiving said steam stream and a desulfurized hydrocarbon gas stream from said desulfurizing assembly, and for generating therefrom a product stream that is rich in hydrogen.

9. The fuel processor as set forth in claim 8, wherein said steam reforming assembly further includes:

a hydrogen purifier coupled to said catalytic steam reforming reactor for separating said product stream into a hydrogen-rich product stream and a hydrogen-depleted reject stream.

10. The fuel processor as set forth in claim 9, wherein said steam reforming assembly further includes a water recovery component coupled to said catalytic steam reforming reactor for recovering excess steam therefrom and directing such excess steam to said steam generator.

11. The fuel processor as set forth in claim 2, wherein said combustion assembly includes:

a combustion fuel reservoir coupled to said separation assembly for receiving the condensed liquid stream; and a combustion reactor for combusting a mixture of fuel from said fuel reservoir and an air feed stream to provide heat to said separation assembly for said vaporization and superheating by said vaporizer and for said catalytic cracking by said cracking reactor.

12. The fuel processor as set forth in claim 11, wherein said combustion reactor includes a catalyst of copper, potassium and vanadium on alumina with 2-20 weight percent loading.

13. The fuel processor as set forth in claim 11, wherein said desulfurization assembly further includes a water recovery component coupled to said combustion reactor and fuel cell exhaust for recovering water into a condensed liquid stream that is directed to said steam reforming assembly.

14. A compact and efficient fuel processor comprising:

a separation assembly for converting and separating a sulfur-containing distillate fuel feed into an aliphatics-rich/sulfur-depleted gas stream and an aromatics-rich and sulfur-rich liquid stream, said separation assembly including a fuel vaporizer, a catalytic cracking reactor downstream of said fuel vaporizer, and a gas-liquid separator downstream of said catalytic cracking reactor, said gas-liquid separator outputting a gas stream and a liquid stream;

a desulfurization assembly having a high temperature adsorber and a low temperature adsorber arranged in series for removing hydrogen sulfide from the gas stream exiting the separation assembly to output desulfurized gas;

a combustion assembly including a combustion fuel reservoir and a combustion reactor in which the liquid stream exiting the separation assembly is combusted with air to yield process heat; and a steam reforming assembly for generating steam using said process heat and for converting, using a catalytic steam reforming reactor, the desulfurized gas exiting the desulfurization assembly to a hydrogen-rich stream;

said fuel processor operating at pressures higher than one atmosphere and temperatures above 300° C. for reforming distillate hydrocarbon fuels containing sulfur to obtain high quality hydrogen product.

15. The fuel processor as set forth in claim 14, wherein said catalytic cracking reactor receives a vaporized and superheated fuel stream from said fuel vaporizer and selectively cracks an aliphatic content of said fuel stream to light hydrocarbon gases while converting any organosulfur species to hydrogen sulfide.

16. The fuel processor as set forth in claim 15, wherein said catalytic cracking reactor includes a catalyst of manganese on alumina with 10-15 weight percent loading.

17. The fuel processor as set forth in claim 15, wherein said separation assembly further includes a fractionator receiving the vaporized and superheated fuel stream from said fuel vaporizer and separating said fuel stream into a heavy liquid residue stream and a light vapor stream, said vapor stream being directed to the cracking reactor and said residue stream joining the liquid stream output by said gas-liquid separator.

18. The fuel processor as set forth in claim 14, wherein said steam reforming assembly further includes a hydrogen purifier coupled to said steam reforming reactor for separating said hydrogen-rich stream into a hydrogen-rich product stream and a hydrogen-depleted reject stream.

19. The fuel processor as set forth in claim 14, wherein each of said steam reforming assembly and said combustion assembly further includes a water recovery component.

20. The fuel processor as set forth in claim 14, wherein said combustion reactor includes a catalyst of copper/potassium/vanadium on alumina with 2-20 weight percent loading.

21. A compact and efficient fuel processor operating at pressures higher than one atmosphere and temperatures above 300° C. for reforming distillate hydrocarbon fuels containing sulfur to obtain high quality hydrogen product, comprising:
- a separation assembly for converting and separating a sulfur-containing distillate fuel feed into an aliphatics-rich and sulfur-depleted gas stream and an aromatics-rich and sulfur-rich liquid stream;
- a combustion assembly for receiving said aromatics-rich and sulfur-rich liquid stream exiting the separation assembly and for combusting said liquid stream with air to yield process heat;
- a reforming assembly in which process heat from the combustion assembly is used to generate steam and convert the aliphatics-rich and sulfur-depleted gas stream to a hydrogen-rich stream; and
- a desulfurization assembly for removing hydrogen sulfide from said hydrogen-rich stream to output desulfurized hydrogen-rich gas.

* * * * *